UNITED STATES PATENT OFFICE 2,128,160

WELL TREATING FLUID

Leo Clark Morgan, Wichita, Kans.

No Drawing. Application August 23, 1937,
Serial No. 160,447

4 Claims. (Cl. 166—21)

The present invention relates to the treatment of wells with acids for the purpose of increasing the production thereof, and has particular reference to an oil well treating fluid of improved properties.

As is well known, in the common method of treating oil wells for the purpose of increasing the production thereof, a charge of acid is introduced into the well, and after the acid has eroded the adjacent acid-soluble earth or rock formation, the spent treating fluid is withdrawn. Although well treating fluids of the prior art have greatly increased the production, they have not been altogether satisfactory in actual use. The prior treating fluids break up the suspension of mud normally present in an oil well, the precipitated mud clogging the capillary pores of the formation and thereby masking the further effectiveness of the acid, interfering with the subsequent removal of the spent acid, and retarding the flow of oil from the well after treatment.

The principal object of the present invention is an improved well treating fluid which obviates the disadvantages of prior reagents of this character.

A further object is a well treating fluid which avoids the clogging of the pores of the earth formation with precipitated mud during the treatment of the well.

Another object is a method of treating oil wells for the purpose of increasing the production thereof, by means of a treating fluid which prevents the clogging of the capillary pores of the rock formation with mud.

Other objects will be apparent as the invention is hereinafter more fully described.

The foregoing objects may be accomplished in accordance with the present invention by means of a well treating fluid comprising an acid capable of forming a water-soluble salt with the earth formation. In order to maintain the mud present in the oil well in a dispersed or suspended condition, a mud-peptizing agent such as a protective colloid is added to the well treating fluid. The resultant well treating fluid prevents the clogging of the pores of the rock formation with precipitated mud, and thereby obviates the disadvantages of the prior art fluids.

The acid which forms the major constituent of the well treating fluid in accordance with the present invention comprises any acid material which is capable of forming water-soluble salts with the earth formation. Preferably I employ commercial hydrochloric acid, for example, muriatic acid, for this purpose, because of its economic availability. It is to be understood, however, that I do not wish to be restricted to this particular mineral acid, since it is apparent to anyone skilled in the art that many other acids, such as other hydrohalides for example, hydrobromic acid, may be employed for the same purpose.

For the purpose of maintaining the mud present in the oil well in a dispersed or suspended condition, a mud-peptizing agent such as a protective colloid is added to the acid, as above pointed out. Numerous protective colloids are available which may be satisfactorily employed for this purpose. Thus as mud-dispersing agents, I may use proteins or proteids, as well as soluble and partly soluble carbohydrates and certain metal salts of organic acids, and in general water-soluble colloids. As examples of the type of materials which I have in mind, I may mention glue, lysalbinic acid, protalbinic acid, isinglass, albumen, starch, sugar, gelatin, agar, gum acacia, gum arabic, sodium citrate, Rochelle salts and the like. Preferably, however, I employ starch or gelatin, since these materials are relatively cheap. As little as 0.15% of these materials is sufficient to maintain the mud in suspension. Of these two materials, gelatin is preferable, inasmuch as starch tends to hydrolize in the acid solution.

In order to explain the nature of the present invention more clearly, a specific embodiment thereof will now be described. It is to be clearly understood, however, that this is done solely by way of example, and is not to be construed as a limitation upon the spirit or scope of the present invention, which has many important embodiments other than that hereinafter particularly described.

A preferred example of my invention comprises commercial hydrochloric acid such as muriatic acid, diluted to 15% strength. To this solution is added 0.15% gelatin. If desired, inhibitors may be added in order to inhibit the action of the acid on the metal equipment employed in treating the well. The resulting solution is highly efficient in maintaining the mud in suspension.

Increase in gelatin concentration tends to increase the amount of mud dispersed. In general, however, an amount between 0.05 and 0.30% will be satisfactory.

Variations in dispersion of mud were ascertained by noting variations in volume of the sediment which settled out after a 15 cc. portion of spent acid is allowed to settle after being initially stirred when the reactants are brought together. Volumes of sediment were determined by noting its height in a eudiometer tube into which the solution had been transferred. Calibrated centrifuge tubes may also be employed for this purpose.

In the foregoing detailed description of the present invention it is apparent that many variations may be made without departing from the spirit and scope thereof. I therefore intend to be restricted only in accordance with the following patent claims.

I claim:

1. A well treating fluid comprising an acid capable of forming water soluble salts with the earth formation, said acid containing a protective colloid capable of maintaining the mud present in an oil well in a suspended and dispersed condition in the presence of strong acids.

2. A well treating fluid comprising a major proportion of muriatic acid and a small proportion of a protective colloid.

3. The well treating fluid of claim 2 wherein said protective colloid is selected from the group consisting of glue and gelatin.

4. The method of treating oil wells which comprises dissolving the earthy substance in the same by means of an acid capable of forming soluble compounds thereof while preventing the clogging of the pores of the earth formation with mud by the presence of a protective colloid in the acid.

LEO CLARK MORGAN.